(12) United States Patent
Bordoloi et al.

(10) Patent No.: US 9,610,569 B2
(45) Date of Patent: Apr. 4, 2017

(54) PROCESS FOR THE PREPARATION OF NI—CEMGAL$_2$O$_4$ CATALYST FOR DRY REFORMING OF METHANE WITH CARBON DIOXIDE

(71) Applicant: COUNCIL OF SCIENTIFIC AND INDUSTRIAL RESEARCH, New Delhi (IN)

(72) Inventors: Ankur Bordoloi, Dehradun (IN); Subhasis Das, Dehradun (IN); Reena Goyal, Dehradun (IN); Rajib Kumar Singha, Dehradun (IN); Chandrasheka R. Pendem, Dehradun (IN); Sivakumar Konathala Laxmi Narayan, Dehradun (IN); Rajaram Bal, Dehradun (IN); Vemulapalli Venkata Durga Nagendra Prasad, Dehradun (IN); Neelam Naidu Botcha, Dehradun (IN); Manoj Kumar, Dehradun (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 252 days.

(21) Appl. No.: 14/513,770

(22) Filed: Oct. 14, 2014

(65) Prior Publication Data
US 2016/0001269 A1    Jan. 7, 2016

(30) Foreign Application Priority Data
Jul. 7, 2014 (IN) ............................ 1843/DEL/2014

(51) Int. Cl.
*B01J 23/78*  (2006.01)
*B01J 21/00*  (2006.01)
(Continued)

(52) U.S. Cl.
CPC ........... *B01J 23/83* (2013.01); *B01J 35/0006* (2013.01); *B01J 35/1019* (2013.01);
(Continued)

(58) Field of Classification Search
CPC ........ Y10T 428/249921; Y10T 428/268; B01J 37/0201; B01J 35/023; B01J 37/0072;
(Continued)

(56) References Cited

PUBLICATIONS

Baek et al. "Combined Steam and Carbon Dioxide Reforming of Methane on Ni/MgAl2O4: Effect of CeO2 Promoter to Catalytic Performance", Nov. 2010, Catalysis Letters, vol. 141, Issue 2, pp. 224-234.*

(Continued)

*Primary Examiner* — Stanley Silverman
*Assistant Examiner* — Syed Iqbal
(74) *Attorney, Agent, or Firm* — Lando & Anastasi, LLP

(57) ABSTRACT

The present invention provides a process and catalyst system for the production of synthesis gas (a mixture of CO and H$_2$) from greenhouse gases like methane and carbon di oxide. The process provide a single step selective reforming of methane with carbon dioxide to produce synthesis gas over Ce—Ni—MgAl$_2$O$_4$ catalyst prepared by using combination of two methods evaporation induced self-assembly and organic matrix combustion method. These suitably combined methods generate a unique catalyst system with very fine Ni nano clusters evenly dispersed in high surface area support. The process provides both Methane and carbon di oxide conversion more than 90% without any noticeable deactivation till 100 hours between temperature range of 500-800° C. at atmospheric pressure.

9 Claims, 6 Drawing Sheets

(51) Int. Cl.
   B01J 23/58    (2006.01)
   B01J 35/10    (2006.01)
   B01J 23/83    (2006.01)
   B01J 37/04    (2006.01)
   B01J 37/08    (2006.01)
   B01J 35/00    (2006.01)
   C01B 3/40     (2006.01)
   B01J 37/02    (2006.01)
(52) U.S. Cl.
   CPC ........... *B01J 37/0215* (2013.01); *B01J 37/04* (2013.01); *B01J 37/088* (2013.01); *C01B 3/40* (2013.01); *C01B 2203/0238* (2013.01); *C01B 2203/1058* (2013.01); *C01B 2203/1082* (2013.01); *C01B 2203/1241* (2013.01)
(58) Field of Classification Search
   CPC . B01J 35/08; B01J 21/005; B01J 23/58; B01J 35/1061; B01J 23/78; B01J 35/02
   See application file for complete search history.

(56) References Cited

PUBLICATIONS

Mosayebi et al. "Low temperature synthesis of nanocrystalline magnesium aluminate with high surface area by surfactant assisted precipitation method: Effect of preparation conditions", Materials Research Bulletin, vol. 47, Issue 9, Sep. 2012, pp. 2154-2160.*

Gonzalez-Delacruz et al. "Study of nanostructured Ni/CeO2 catalysts prepared by combustion synthesis in dry reforming of methane." Applied Catalysis A, General 384 (2010) 1-9.

Hadian et al. "CO2 reforming of methane over nickel catalysts supported on nanocyrstalline MgAl2O4 with high surface area." Journal of Natural Gas Chemistry vol. 21 No. 2 2012.

Huang et al. Methane reforming reaction with carbon dioxide over SBA-15 supported Ni—Mo bimetallic catalysts. Fuel Processing Technology 92 (2011) 1868-1875.

Kambolis et al. "Ni/CeO2—ZrO2 catalysts for the dry reforming of methane." Applied Catalysis A: General 377 (2010) 16-26.

Kang et al. "Catalytic test of supported Ni catalysts with core/shell structure for dry reforming of methane." Fuel Processing Technology 92 (2011) 1236-1243.

Koo et al. "Syngas production via combined steam and carbon dioxide reforming of methane over Ni—Ce/MgAl2O4 catalysts with enchanced coke resistance." Fuel Processing Technology vol. 119 (2014) 151-157.

Koubaissy et al. "CO2 reforming of methane over Ce—Zr—Ni—Me mixed catalysts." Catalysis Today 157 (2010) 436-439.

Ocsachoque et al. "Rh—Ni/CeO2—Al2O3 catalysts for methane dry reforming." Catalysis Today 172 (2011) 226-231.

* cited by examiner

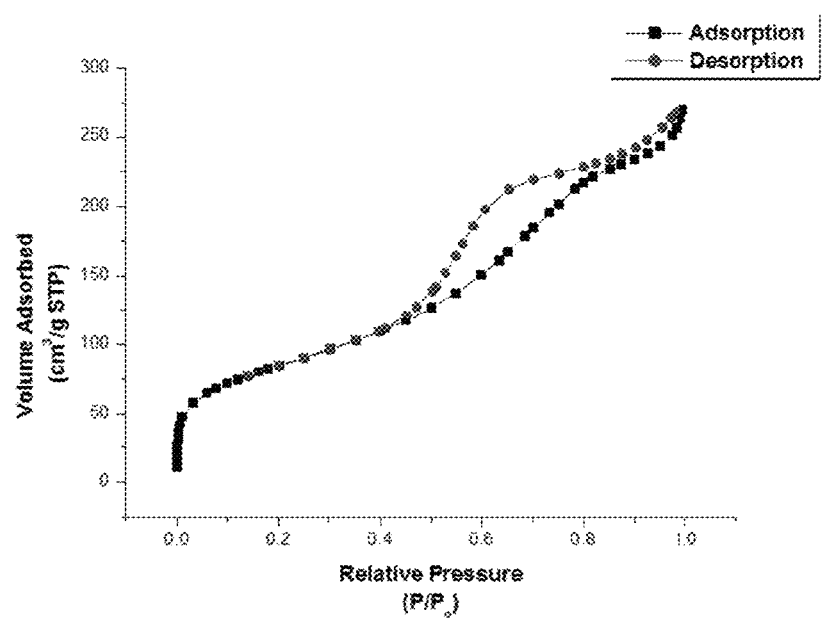
Figure 1.1
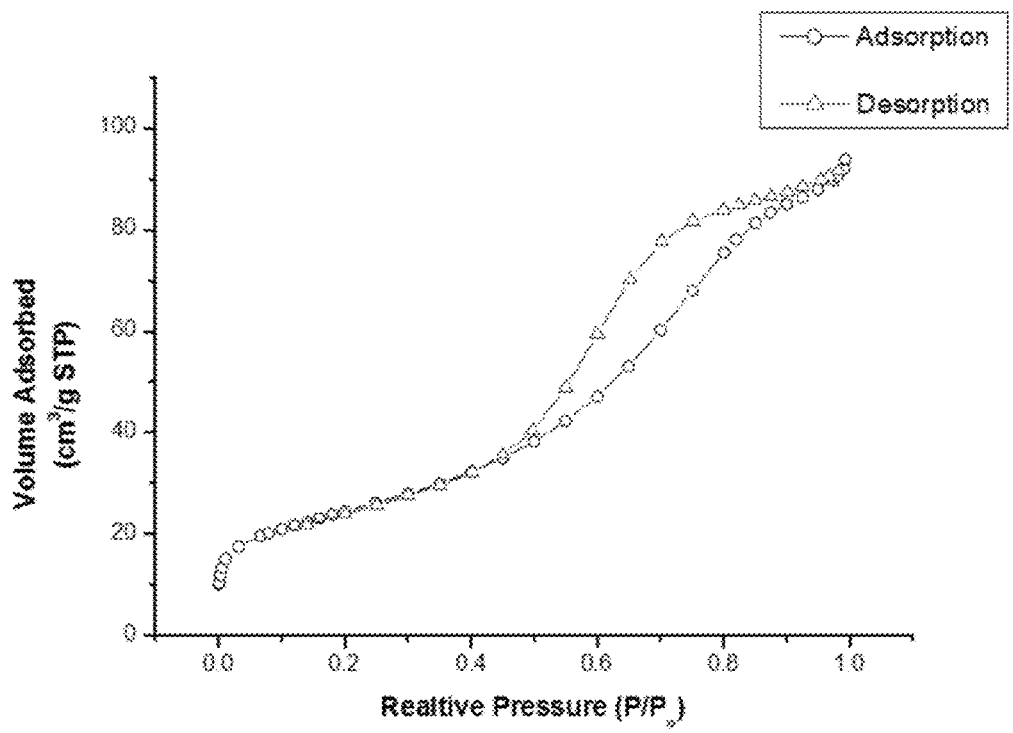
Figure 1.2

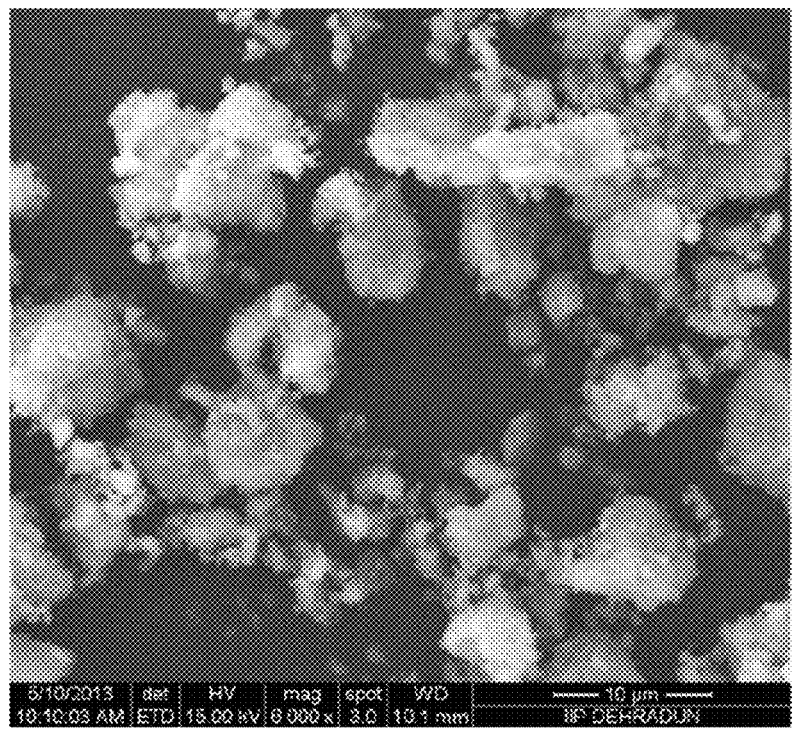
Figure 4.1
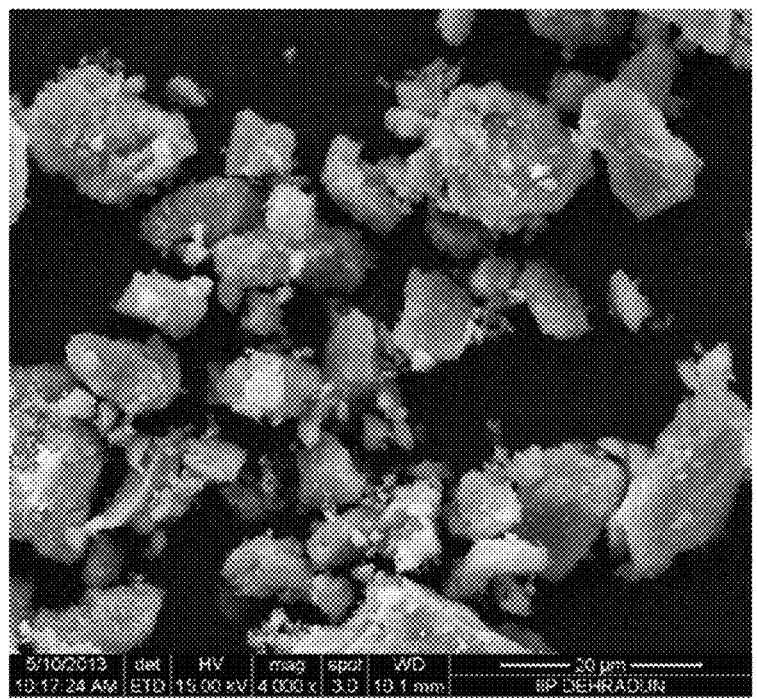
Figure 4.2

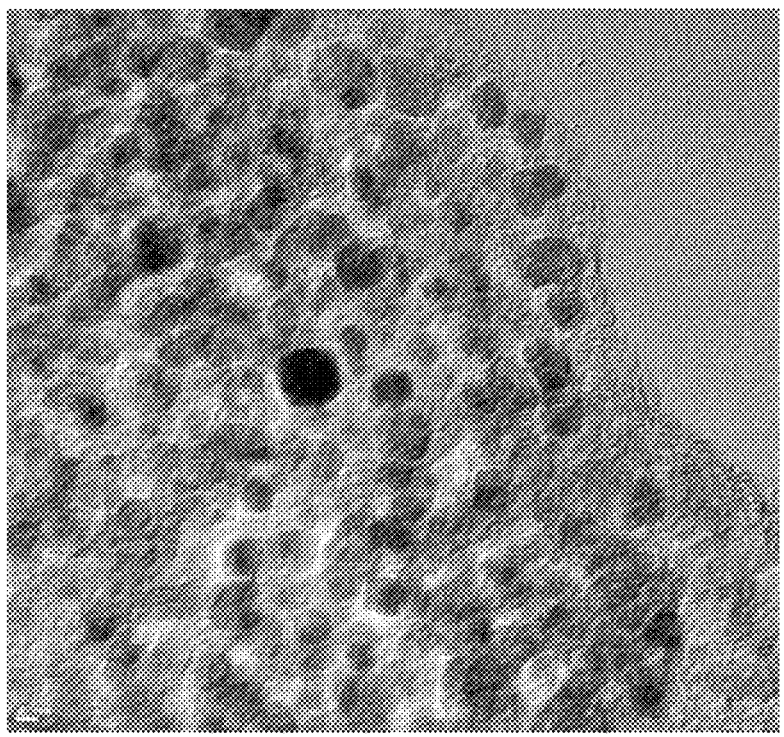
Figure 5.1
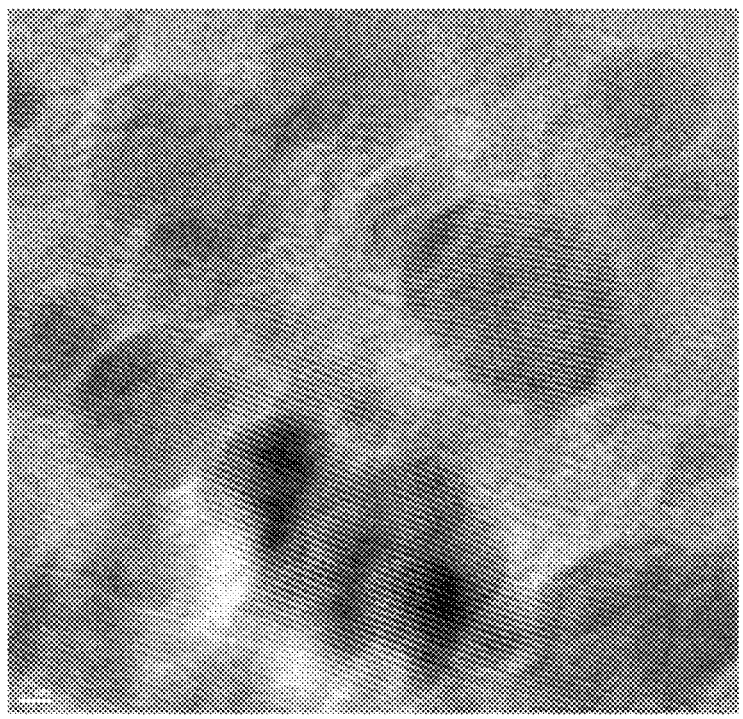
Figure 5.2

PROCESS FOR THE PREPARATION OF NI—CEMGAL$_2$O$_4$ CATALYST FOR DRY REFORMING OF METHANE WITH CARBON DIOXIDE

CROSS-REFERENCE TO RELATED APPLICATION

This application claims the benefit of priority under 35 U.S.C. §119 to Indian Patent Application Serial No. 1843/DEL/2014 filed Jul. 7, 2014, the entire disclosure of which is hereby incorporated herein by reference in its entirety for all purposes.

FIELD OF INVENTION

The present invention relates to a process for the preparation of Ce—Ni—MgAl$_2$O$_4$ catalyst for dry reforming of methane with carbon dioxide. Particularly, the present invention relates to a process for the vapour phase reforming of methane with carbon dioxide for the production of synthesis gas (a mixture of CO and H$_2$). More particularly the present invention relates to a process for the reforming of methane to synthesis gas with a H$_2$ to CO ratio 1-1.2 at atmospheric pressure over Ce—Ni—MgAl$_2$O$_4$ solid catalyst.

BACKGROUND OF THE INVENTION

Although research into the CO$_2$ reforming of natural gas had been initiated in the 1920s, it gained renewed interest in the 1990s because of its potential applications in the greenhouse chemistry. It is a promising means of disposing and recycling two important greenhouse gasses, CH$_4$ and CO$_2$, and a route to producing valuable synthesis gas.

Compared with steam reforming or partial oxidation of methane, carbon dioxide reforming of methane provides synthesis gas with a relative low H$_2$/CO ratio, which is more desirable for the direct use as feedstock for the synthesis of hydrocarbons, oxygenates, hydroformylation, oxo synthesis, and so on. Also, this reaction is usually considered as chemical energy transmission system (CETS) due to its strong endothermic characteristic, in which a power source generated from solar or nuclear energy drives this intensively endothermic reforming reaction and converts these inexpensive energies into valuable chemical energy.

However, the major drawback of this catalytic process up to now remains the rapid deactivation of the catalysts originating from the sintering of the metal active sites as well as the carbon deposition. Therefore, the recent research focus in this field has been mainly concentrated on developing catalysts with favourable capacity of anti-coke and anti-sintering.

Many kinds of catalysts using Ni or noble metals such as Ru, Rh, Pd, Ir and Pt have been reported to be active in this reaction. Noble metals have promising catalytic properties and low sensitivities to carbon deposits compared to Nickel however limited resources and high cost of noble metals limits their application in large-scale processes. Hence, Ni catalysts have been extensively investigated because of the metal availability and economic reasons.

Although Ni-based catalysts exhibit high activity and selectivity and are cheap, but the major drawback of this reaction, however, is the rapid deactivation of catalysts as a result of carbon deposition and sintering of Ni metal particles. Thus, in recent years, much effort has been devoted to developing Ni-based catalysts with improved performance, i.e. lower coke deposition and higher stability against metal sintering.

Former experimental and theoretical studies have confirmed that size of the Ni particle has a crucial role in suppressing coke. It has been reported that carbon deposition can occur only when the metal cluster is greater than a critical size. Therefore, to inhibit carbon deposition, it should be ensured that the size of the metal cluster is smaller than the critical size needed for coke formation.

Hence, many methods have been explored recently in order to obtain Mesoporous nanocrystalline powders with high surface areas for catalytic applications. They provide catalysts with more edges and corners, which can lead to higher performance.

Among the catalyst supports, magnesium aluminate spinel, MgAl$_2$O$_4$, has been widely used in industrial applications. This material has unique properties, such as high melting temperature (2135° C.), high mechanical strength at elevated temperature, high chemical inertness, good thermal shock resistance and catalytic properties Several synthesis methods for the preparation of MgAl$_2$O$_4$ spinel powders have been employed, such as: sol-gel, hydrothermal, combustion and co-precipitation. For many of its applications especially as catalyst support, a high surface area, small crystalline size, high porosity and more active sites, are more desired. Due to the low density and good thermal stability, it has long been used as catalyst support for catalytic reforming.

Also, the studies report that Ceria is an effective promoter to prevent the metallic sintering and to favour the activity as well as the resistance to coke formation. It is known for its high oxygen storage/transport capacity (OSC), i.e. its ability to use its lattice oxygen under oxygen poor environment and quickly reoxidize under oxygen rich environment. Thus, it increases nickel dispersion and enhances resistance towards sintering and coke formation.

Reference may be made to the article Applied Catalysis A, General 384 (2010) 1-9, by V. M. Gonzalez-Delacruz et al. where they got about 50%, 40%, 35% methane conversion at 750° C. temperature at the GHSV 3,00,000 L/kg h over Ni—CeO$_2$ (26% Ni), Ni—CeO$_2$ (13% Ni), Ni—CeO$_2$ (7% Ni) catalyst. The main drawback of this process is the relative low conversion of methane (only 50%, 40%, and 35%) which decreases with time; furthermore, the GHSV of the process is too high.

Reference may be made to the article Applied Catalysis A: General 377 (2010) 16-26, by A. Kambolis et al. in which they got about 20-40% conversion of methane and 34-54% of carbon dioxide at 973° C. by using Ni/CeO$_2$—ZrO$_2$ catalyst. The main drawback of this process is the relative low conversion of both methane and carbon di oxide. Furthermore, 973° C. is high temperature.

Reference may be made to the article Catalysis Today 157 (2010) 436-439 by B. Koubaissy et al. in which they got 90% conversion of both the methane and carbon dioxide at 800° C. At a GHSV of 30 L h$^{-1}$ g$^{-1}$ by using Ce$_2$Zr$_{1.51}$Ni$_{0.49}$Rh$_{0.03}$ as a catalyst. The main drawback of this process is although Rh-based catalysts display unique efficiency and selectivity in catalysing dry reforming, but its high cost is a major problem for industrialisation.

Reference may be made to the article Catalysis Today 172 (2011) 226-231, by M. Ocsachoque et al in which they got 68%, 75%, 85% conversion respectively at 750° C. at a GHSV of 2,00,000 mL/hr./g by using the catalyst Ni/Al, Ni/Ce (3%) Al and Rh—Ni (3%)/Ce Al respectively. Although the conversion of both methane and carbon di oxide are quite appreciable however the GHSV of the reaction is too high, as well as in the third catalyst they used Rh, the high cost of Rh is the main problem for its industrialisation.

Reference may be made to the article Fuel Processing Technology 92 (2011) 1236-1243, by K. -M. Kang et al. in which they got 92% and 95% conversion of methane and carbon dioxide at 800° C. temperature by using Ni/Al$_2$O$_3$ as a catalyst and 92.5% and 91.8% conversion by using Ni/MgO—Al$_2$O$_3$ as catalyst.

Reference may be made to the article Fuel Processing Technology 92 (2011) 1868-1875, by T. Huang et al. in which they got 96% methane conversion at 4000 ml g$_{cat}^{-1}$h$^{-1}$ GHSV, at 800° C. over (0.5%) Mo-(1%) Ni/SBA-15 catalyst. Although the reaction gives quite good methane conversion nevertheless, the authors did not provide any result about carbon dioxide.

Reference may be made to the article Journal of Natural Gas Chemistry Vol. 21 No. 2 2012, in which they got 70% methane and 74% carbon di oxide conversion at 700° C. at 18,000 mL/hr./g GHSV by using 7 wt. % Ni/MgAl$_2$O$_4$ catalysts. Although they got quite appreciable result however the GHSV of the reaction is too high.

Reference may be made to the article fuel processing technology vol. 119 (2014) 151-157, in which they got 74-81% methane conversion and 52-67% carbon dioxide conversion at 700° C. with the gas mixture CH$_4$:H$_2$O:CO$_2$:N$_2$=1:0.8:0.4:1 with a GHSV of 530,000 mL/h-g$_{cat}$ in a combined steam and carbon di oxide of methane by using Ni—CeMgAl$_2$O$_4$ catalyst with varying Ce:Ni ratio 0-1 and commercial MgAl$_2$O$_4$. Although they got quite good result but the surface area of the catalyst is too low as well as it doesn't gives good conversion for prolonged time as there is significant amount of coke deposition occurs during the reaction. By the use of different and improve process parameters to our catalyst (i.e., temperature, flow rates, feed compositions) provide more durable and better coke inhabitant catalyst system and the difference in the catalyst preparation method (i.e., mode of preparation of support, procedure to synthesis of Ni nanoparticles, size of the particles in the catalyst, the metal and support precursors used for synthesis etc.) which provide us a high surface area support and very small Ni nanoparticles. Combination of both the two parameters in the catalyst system enhances the coke resistivity and the stability of the catalyst system in aforementioned operation conditions.

The challenges of the process reported so far is that although they exhibit sufficiently high conversion of methane and high selectivity of syngas of unit H$_2$/CO ratio but the rapid formation of coke causes deactivation of reforming catalyst. To overcome the deactivation of reforming catalyst many researchers used noble metals such as Pt, Ru, Rh etc. but the rising cost and relatively poor availability desiccates the use of those catalysts in industrial purpose. On this economic boundation, Ni based catalyst will be the holy grail for methane reforming in coming future. There is therefore, an evident necessity for further improvements in the Ni based catalyst and process for the dry reforming of methane with carbon di oxide.

OBJECTS OF THE INVENTION

The main objective of this invention is to provide a process for the preparation of Ce—Ni—MgAl$_2$O$_4$ catalyst for dry reforming of methane with carbon dioxide.

Another objective of present invention is to provide a process for the reforming of methane with carbon dioxide to produce synthesis gas at atmospheric pressure which has highly coke resisting properties till 100 hours' time on stream.

Still another objective of the present invention is to provide processes which produce synthesis gas from methane and carbon dioxide with a H$_2$ to CO ratio 1-1.2.

Yet another objective of the present invention is to provide an improved process for dry reforming over Ce—Ni—MgAl$_2$O$_4$ catalyst.

Yet another object of this invention is to provide a process, which can effectively utilize the abundantly available greenhouse gases methane and carbon dioxide.

Yet another object of the present invention is to provide a process which works selectively under simple operating condition.

Yet another object of the present invention is to provide a catalyst with a mixture of Ni, Ce, Mg, Aluminium oxide which can be prepared easily and economically to produce synthesis gas by reforming of methane with carbon dioxide.

SUMMARY OF THE INVENTION

Accordingly, the present invention provides a process for the preparation of Ni—CeMgAl$_2$O$_4$ catalyst wherein the said process comprising the steps of;
i. dissolving Aluminium isopropoxide in a mixture of ethanol and concentrated nitric acid;
ii. preparing a second solution by dissolving Poly (ethylene glycol)-block-poly (propylene glycol)-block-poly (ethylene glycol) (P123) in mole ration ranging between 0.003-0.004 in ethanol;
iii. adding salt of Magnesium and Cerium into the second solution;
iv. mixing solution as prepared in step (i) and step (iii) and stirring for 8-10 hrs at room temp 25° C. for homogenation and kept for drying at 60-80° C. for 48-72 h and calcing at a range 700-900° C. for 6-8 hr and subsequently depositing nickel particles onto it to and further calcining at temperature 400-600° C. 6-8 h to obtain Ni—CeMgAl$_2$O$_4$ catalyst.

In an embodiment of the present invention the wt % of Ni to Ce—MgAl$_2$O$_4$ of the catalyst is varied in the range 1-10% (Ni:Ce—MgAl$_2$O$_4$).

In one embodiment of the present invention the wt % of MgO to Al$_2$O$_3$ of the catalyst is varied in the range of 1-5% (MgO:Al$_2$O$_3$).

In another embodiment of the present invention the wt % of Ce to Al$_2$O$_3$ is in the range of 0.1-5% Ce:Al$_2$O$_3$).

In another embodiment of the present invention Ni—CeMgAl2O4 catalyst contains high surface area in the range of 309-327 m2 g−1.

Still in another embodiment of the present invention a process for dry reforming of methane with carbon dioxide using Ni—CeMgAl$_2$O$_4$ catalyst as obtained by the process as claimed in claim 1, wherein the said process comprises reducing the catalyst at 10-20% H$_2$/He mixture at temperature ranging between 800-1000° C. for a period ranging between 1-4 hrs. subsequently contacting 10-15% Methane, 10%-15% Carbon dioxide and 70-80% Helium at gas hours space velocity 10,000 cm$^3$ g$^{-1}$ h$^{-1}$ to 15,000 cm$^3$ g$^{-1}$ h$^{-1}$ over the catalyst at temperature ranging between 500-800° C. at atmospheric pressure to obtain syngas.

Still in another embodiment of the present invention conversions of CH$_4$ and CO$_2$ are in the range of 90%-98% for both.

Still in another embodiment of the present invention conversions of $CH_4$ and $CO_2$ are more than 90% without any noticeable deactivation till 100 hours.

Still in another embodiment of the present invention synthesis gas is obtained from methane and carbon dioxide with a $H_2$ to CO ratio in the range of 0.9-1.2.

BRIEF DESCRIPTION OF DRAWINGS

FIG. 1.1: Nitrogen Adsorption/Desorption Isotherm NCE2.
FIG. 1.2: Nitrogen Adsorption/Desorption Isotherm YCE1.
FIG. 4.1: SEM image of NCE2.
FIG. 4.2: SEM image of YCE1.
FIG. 5.1: HRTEM image of YCE1.
FIG. 5.2: HRTEM image of YCE1.

DETAILED DESCRIPTION OF THE INVENTION

Figure 2:
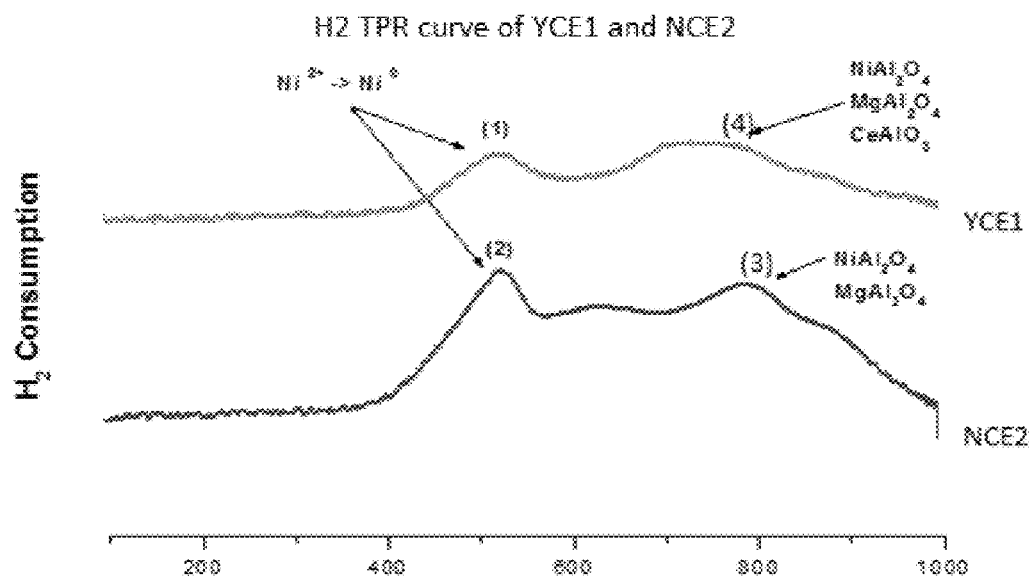
FIG. 2: TPR curve of YCE1 and NCE2 catalysts.

The present invention provides a process for the preparation of Ni—Ce—$MgAl_2O_4$ to produce synthesis gas by reforming of methane with carbon di oxide, which involves the following steps The process for the preparation of Ni—Ce—$MgAl_2O_4$ catalyst comprising the steps:

Synthesis of Ce—$MgAl_2O_4$ using sol composition of Aluminium isopropoxide, Cerium nitrate, Magnesium nitrate, Nitric acid, Ethanol, and template.

The mixing gel was stirred for 8-10 hours.

The wt. % of Ce in catalyst varied in the range between 0-5%.

The wt. % of MgO in catalyst varied in the range between 1-5%.

The resulting gel was dried for 48-72 hours.

The solid was calcined at range 700-900° C.

Synthesis of Ni—$CeMgAl_2O_4$ catalyst using organic matrix decomposition method The wt. % of Ni in catalyst varied in the range between 1-10%.

Calcination of material was performed at 400° C.

General Procedure for the Reforming of Methane with $CO_2$ to Produce Syngas:

The dry reforming of methane was carried out in a fixed-bed micro reactor under atmospheric pressure. Typically 200 mg of catalyst was reduced at 20% $H_2$/He mixture at 800° C. for 2 hr before each reaction. Then reaction was performed with the flow of 10% Methane, 10% Carbon dioxide and 80% Helium at gas hour's space velocity 10,000 $cm^3$ $g^{-1}$ $h^{-1}$. The product was analysed using a gas chromatography (THERMO) fitted with a TCD using PORAPACK Q column.

The following examples are given by way of illustration of working of the invention in actual practice and should not be constructed to limit the scope of the present invention in any way Example-1

Preparation of VMGx Catalysts

Variation of Magnesium Oxide in the Catalyst

Anhydrous Aluminium isopropoxide (4.1 g) was dissolved in a mixture of ethanol (50 mL) and concentrated nitric acid (50 mL) and kept for 8 hr under vigorous stirring at room temperature (25° C.). A second solution containing Poly (ethylene glycol)-block-poly (propylene glycol)-block-poly (ethylene glycol) 2 g was dissolved in ethanol (50 mL). Necessary amount (given below) of Magnesium nitrate hexahydrate was added into the solution respectively. Then the two solutions was mixed and stirred for 8 h at room temp (25° C.) for homogenation and kept for drying. The obtained material was calcined at 700° C. for a period of 6 h.

The Nickel particles were deposited on the synthesized support via organic matrix decomposition method. In a typical procedure a 500 ml solution of 0.3099 g of nickel nitrate hexahydrate, 2 g of the calcined support, and a 0.32 g 500 ml solution of urea were mixed and stirring at 95° C. for 48 hrs. The obtained material was filtered and calcined at 400° C. for 6 hrs. The obtained catalyst was denoted as VMGx, where "x" is the % of MgO present in the catalyst. In the present case three different types of catalyst named VMG1, VMG2 and VMG3 contains 1% (0.01 g), 2% (0.020 g), and 3% (0.030 g) of Magnesium nitrate, hexahydrate with respect to the supporting material alumina (by calcined aluminium isopropoxide gives alumina), which on calcination turned to magnesium oxide.

Example-2

Preparation of NCEy Catalyst

Variation of Nickel in the Catalyst

Anhydrous Aluminium isopropoxide (4.1 g) was dissolved in a mixture of ethanol (50 mL) and concentrated nitric acid (50 mL) and kept for 8 hr under vigorous stirring at room temperature (25° C.). A second solution containing Poly (ethylene glycol)-block-poly (propylene glycol)-block-poly (ethylene glycol) 2 g was dissolved in ethanol (50 mL). Magnesium nitrate hexahydrate (0.1953 g) was added into the solution respectively. Then the two solutions was mixed and stirred for 8 h at room temp (25° C.). for homogenation and kept for drying. The obtained material was calcined at 700° C. for a period of 6 h.

The Nickel particles were deposited on the synthesized support via organic matrix decomposition method. The obtained material was calcined at 400° C. for 6 hrs. The obtained catalyst was denoted as NCEy, where "y" is the % of Ni present in the catalyst. In the present case three different types of catalyst named NCE1, NCE2 and NCE3 contains 2.5% (0.25 g), 5% (0.5 g), and 7.5% (0.74 g) of Nickel Nitrate, Hexahydrate with respect to the 2 g of $MgAl_2O_4$ support.

The Nickel particles were deposited on the synthesized support via organic matrix decomposition method. In a typical procedure a 500 ml solution of necessary nickel nitrate hexahydrate, 2 g of the calcined support, and a 0.32 g 500 ml solution of urea were mixed and stirring at 95° C. for 48 hrs. The obtained material was filtered and calcined at 400° C. for 6 hrs.

The catalyst (NCE2) was characterized using X-ray diffraction (XRD), Scanning electron microscopy (SEM), inductively coupled plasma atomic emission spectroscopy (ICP-AES), $N_2$ physisorption analysis.

Figure 3:
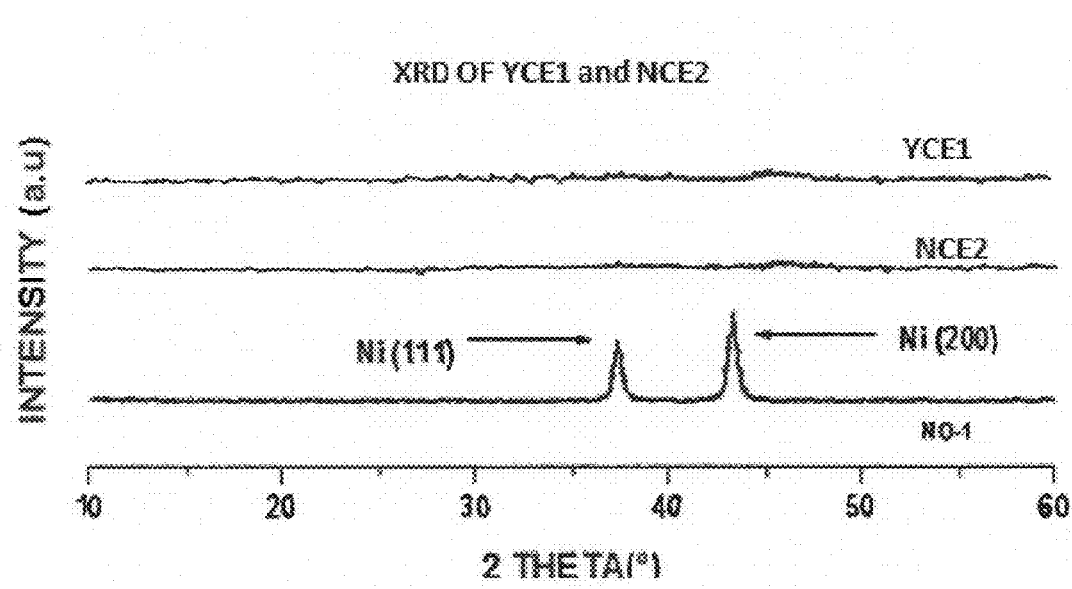
FIG. 3: XRD pattern of the catalysts YCE1 and NCE2.

The XRD pattern of the NCE2 catalyst is shown in FIG. 3. XRD of the sample does not give any peak may be due to the size of the particle is very small i.e., less than 5 nm. The morphology of the material (NCE2) is shown in SEM analysis. The SEM of the catalyst indicates the presence of sponge like structure (shown in FIG. 4). The composition of the catalyst is confirmed from inductively coupled plasma atomic emission spectroscopy (ICP-AES). The TPR of the catalyst confirms the presence of spinal structure in the catalyst (shown in FIG. 2). The $N_2$ sorption measurement indicates high surface area of the catalyst (shown in the Table 1).

Example-3

Preparation of YCEz Catalyst

Variation of Cerium in the Catalyst

Anhydrous Aluminium isopropoxide (4.1 g) was dissolved in a mixture of ethanol (50 mL) and concentrated nitric acid (50 mL) and kept for 8 hr under vigorous stifling at room temperature (25° C.). A second solution containing Poly (ethylene glycol)-block-poly (propylene glycol)-block-poly (ethylene glycol) 2 g was dissolved in ethanol (50 mL). Magnesium nitrate hexahydrate (0.59 g) and necessary Cerium nitrate hexahydrate (0.0619 g) was added into the solution respectively. Then the two solutions was mixed and stirred for 8 hrs at 25° C. for homogenation and kept for drying. The obtained material was calcined at 700° C. for a period of 6 h.

The Nickel particles were deposited on the synthesized support via organic matrix decomposition method. In a typical procedure a 500 ml solution of 0.3099 g of nickel nitrate hexahydrate, 2 g of the calcined support, and a 0.32 g 500 ml solution of urea were mixed and stirring at 95° C. for 48 hrs. The obtained material was filtered and calcined at 400° C. for 6 hrs. The obtained catalyst was denoted as YCEz, where "z" is the % of Ce present in the catalyst. In the present case three different types of catalyst named YCE1, YCE2 and YCE3 contains 1% (0.032 g), 2% (0.063 g), and 3% (0.094 g) of Cerium Nitrate, Hexahydrate with respect to the 2 g of $MgAl_2O_4$ support.

The best catalyst among this (YCE1) was characterized using X-ray diffraction (XRD), Scanning electron microscopy (SEM), inductively coupled plasma atomic emission spectroscopy (ICP-AES), $N_2$ physisorption analysis, High Resolution Transmission Electron Spectroscopy (HRTEM).

Figure 6:
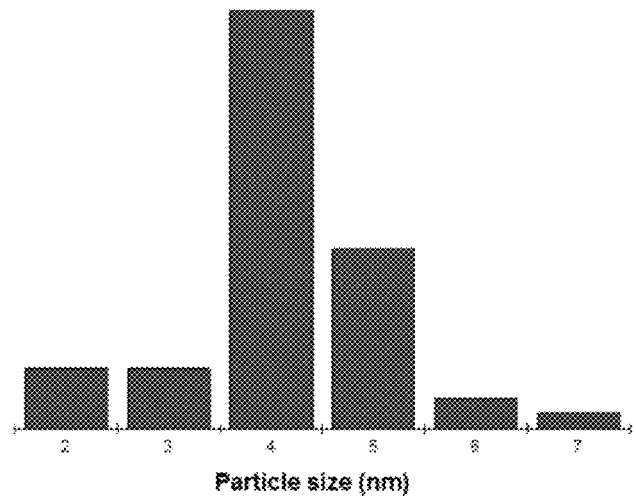
FIG. 6. The average particle size in YCE1.

The XRD pattern of the YCE1 catalyst is shown in FIG. 3. XRD of the sample does not give any peak may be due to the size of the particle is very small. The morphology of the material (YCE1) is shown in SEM analysis. The SEM of the catalyst indicates the presence of sponge like structure (shown in FIG. 4.2). The composition of the catalyst is confirmed from inductively coupled plasma atomic emission spectroscopy (ICP-AES). The TPR of the catalyst confirms the presence of spinal structure in the catalyst (shown in FIG. 2). The $N_2$ sorption measurement indicates high surface area of the catalyst (shown in Table 1). The TEM analysis of the sample indicates the average particle size in the sample is 4 nm (shown in FIG. 6).

TABLE 1

$N_2$ Physisorption Analysis Results for Catalyst

| Materials | Surface area ($m^2 g^{-1}$) | Pore diameter (nm) | Pore volume ($cm^3 g^{-1}$) |
|---|---|---|---|
| $Al_2O_3$ | 300 | 6.8 | 0.70 |
| NCE2 | 309 | 4.8 | 0.12 |
| YCE1 | 327 | 6.9 | 0.13 |

Example-4

This example describes the effect of Ce (as prepared in example 3) on the catalyst for dry reforming of methane under atmospheric pressure. (Table 2)

Process Conditions
Catalyst: 0.2 g
Pressure: Atmospheric pressure
Reduction temperature: 800° C.
Reaction temperature: 500-800° C.
Flow of the gas: Methane (99.99%)=4 ml
Carbon dioxide (99.99%)=4 ml
Helium (99.999%)=26 ml
The total flow of the gas is calculated according to the GHSV 10000 $cm^3 g^{-1} h^{-1}$.

TABLE 2

| Catalyst | Wt. % of Ce loading | Wt. % of Ni loading | Wt. % of MgO loading | Temperature (in ° C.) | $CH_4$ Conversion (in %) | $CO_2$ Conversion (in %) | $H_2$/CO ratio |
|---|---|---|---|---|---|---|---|
| YCE1 | 1 | 5 | 3 | 800 | 95.61 | 97.94 | 1.09 |
|  |  |  |  | 750 | 91.00 | 96.53 | 1.12 |
|  |  |  |  | 700 | 83.11 | 91.79 | 1.08 |
|  |  |  |  | 650 | 76.98 | 84.22 | 1.30 |
|  |  |  |  | 600 | 61.41 | 68.52 | 1.20 |
|  |  |  |  | 550 | 43.74 | 48.80 | 1.06 |
|  |  |  |  | 500 | 27.63 | 29.13 | 1.05 |
| YCE2 | 2 | 5 | 3 | 800 | 85.70 | 99.45 | 1.26 |
|  |  |  |  | 750 | 86.75 | 95.02 | 1.09 |
|  |  |  |  | 700 | 82.95 | 94.12 | 1.12 |
|  |  |  |  | 650 | 74.74 | 86.36 | 1.31 |
|  |  |  |  | 600 | 68.78 | 71.22 | 1.61 |
|  |  |  |  | 550 | 45.44 | 50.33 | 0.98 |
|  |  |  |  | 500 | 37.62 | 43.95 | 1.47 |
| YCE3 | 3 | 5 | 3 | 800 | 91.72 | 96.55 | 1.48 |
|  |  |  |  | 750 | 88.97 | 99.06 | 1.32 |
|  |  |  |  | 700 | 83.26 | 91.41 | 1.3 |
|  |  |  |  | 650 | 68.43 | 78.92 | 1.34 |
|  |  |  |  | 600 | 48.36 | 59.08 | 1.32 |

TABLE 2-continued

| Catalyst | Wt. % of Ce loading | Wt. % of Ni loading | Wt. % of MgO loading | Temperature (in ° C.) | CH$_4$ Conversion (in %) | CO$_2$ Conversion (in %) | H$_2$/CO ratio |
|---|---|---|---|---|---|---|---|
| | | | | 550 | 28.83 | 35.82 | 1.29 |
| | | | | 500 | 17.68 | 21.55 | 1.34 |

Example-5

This example describes the effect of Ni on the catalyst (as prepared in example 2) for dry reforming of methane under atmospheric pressure. (Table-2)

Process Conditions
Catalyst: 0.2 g
Pressure: Atmospheric pressure
Reduction temperature: 800° C.
Reaction temperature: Varied from 500-800° C.
Flow of the gas: Methane (99.99%)=4 ml
Carbon dioxide (99.99%)=4 ml
Helium (99.999%)=26 ml The total flow of the gas is calculated according to the GHSV 10000 cm3 g−1 h−1.

TABLE 3

| Catalyst | Wt. % of Ce loading | Wt. % of Ni loading | Wt. % of MgO loading | Temperature (in ° C.) | CH$_4$ conversion (in %) | CO$_2$ Conversion (in %) | H$_2$/CO ratio |
|---|---|---|---|---|---|---|---|
| NCE1 | 0 | 2.5 | 3 | 800 | 99.88 | 98.82 | 1.11 |
| | | | | 750 | 91.02 | 93.93 | 1.32 |
| | | | | 700 | 80.57 | 85.74 | 1.12 |
| | | | | 650 | 64.53 | 69.89 | 1.14 |
| | | | | 600 | 48.77 | 52.56 | 1.38 |
| | | | | 550 | 27.03 | 26.64 | 1.16 |
| | | | | 500 | 19.04 | 13.69 | 1.74 |
| NCE 2 | 0 | 5 | 3 | 800 | 100 | 87.87 | 1.61 |
| | | | | 750 | 87.59 | 97.58 | 1.11 |
| | | | | 700 | 78.53 | 93.82 | 1.08 |
| | | | | 650 | 76.52 | 82.57 | 1.16 |
| | | | | 600 | 67.62 | 68.45 | 1.34 |
| | | | | 550 | 44.78 | 46.38 | 0.95 |
| | | | | 500 | 23.32 | 28.39 | 0.72 |
| NCE3 | 0 | 7.5 | 3 | 800 | 96.18 | 96.17 | 1.52 |
| | | | | 750 | 86.66 | 95.29 | 1.43 |
| | | | | 700 | 75.09 | 86.76 | 1.25 |
| | | | | 650 | 61.08 | 70.99 | 1.26 |
| | | | | 600 | 45.52 | 53.47 | 1.27 |
| | | | | 550 | 18.46 | 23.38 | 1.03 |
| | | | | 500 | 16.87 | 20.98 | 1.23 |

Example-6

This example describes the effect of MgO on dry reforming of methane under atmospheric pressure. (as prepared in example 1)

Process Conditions
Catalyst: 0.2 g
Pressure: Atmospheric pressure
Reduction temperature: 800° C.
Reaction temperature: Varied from 500-800° C.
Flow of the gas: Methane (99.99%)=4 ml
Carbon dioxide (99.99%)=4 ml
Helium (99.999%)=26 ml The total flow of the gas is calculated according to the GHSV 10000 cm$^3$ g$^{-1}$ h$^{-1}$.

TABLE 4

| Catalyst | Wt. % of Ce loading | Wt. % of Ni loading | Wt. % of Mgo loading | Temperature (in ° C.) | CH$_4$ conversion (in %) | CO$_2$ Conversion (in %) | H$_2$/CO ratio |
|---|---|---|---|---|---|---|---|
| VMG 1 | 0 | 5 | 1 | 800 | 87.87 | 83.97 | 0.98 |
| | | | | 750 | 79.55 | 77.47 | 1.00 |
| | | | | 700 | 69.39 | 66.59 | 1.03 |

TABLE 4-continued

| Catalyst | Wt. % of Ce loading | Wt. % of Ni loading | Wt. % of Mgo loading | Temperature (in ° C.) | $CH_4$ conversion (in %) | $CO_2$ Conversion (in %) | $H_2/CO$ ratio |
|---|---|---|---|---|---|---|---|
| | | | | 650 | 68.85 | 68.07 | 1.35 |
| | | | | 600 | 57.87 | 53.97 | 1.15 |
| | | | | 550 | 53.62 | 50.62 | 1.11 |
| | | | | 500 | 43.98 | 40.76 | 1.23 |
| VMG2 | 0 | 5 | 2 | 800 | 87.87 | 84.36 | 1.07 |
| | | | | 750 | 79.55 | 79.62 | 1.10 |
| | | | | 700 | 79.39 | 79.99 | 1.12 |
| | | | | 650 | 68.85 | 69.18 | 1.16 |
| | | | | 600 | 59.77 | 58.49 | 1.25 |
| | | | | 550 | 50.87 | 47.87 | 1.19 |
| | | | | 500 | 48.76 | 43.98 | 1.16 |
| VMG3 | 0 | 5 | 3 | 800 | 100 | 90.12 | 0.94 |
| | | | | 750 | 86.89 | 89.85 | 0.97 |
| | | | | 700 | 87.31 | 89.11 | 1.00 |
| | | | | 650 | 79.49 | 78.59 | 1.03 |
| | | | | 600 | 69.21 | 67.31 | 1.12 |
| | | | | 550 | 56.74 | 49.89 | 1.04 |
| | | | | 500 | 47.78 | 45.51 | 1.12 |

Figure 7:
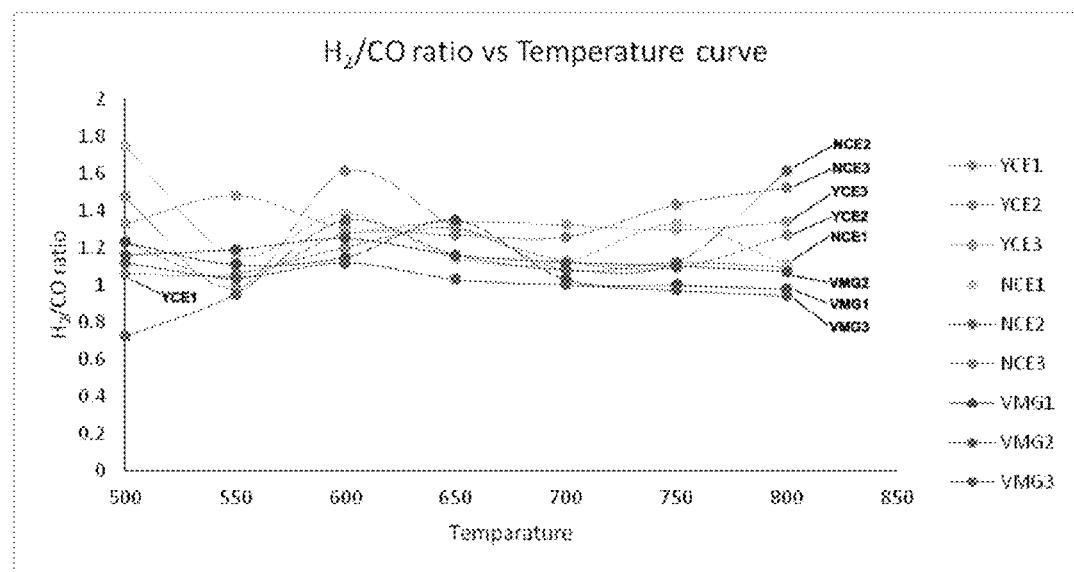
FIG. 7: $H_2$/CO ratio vs. Temperature curve of different catalysts.
Figure 8:
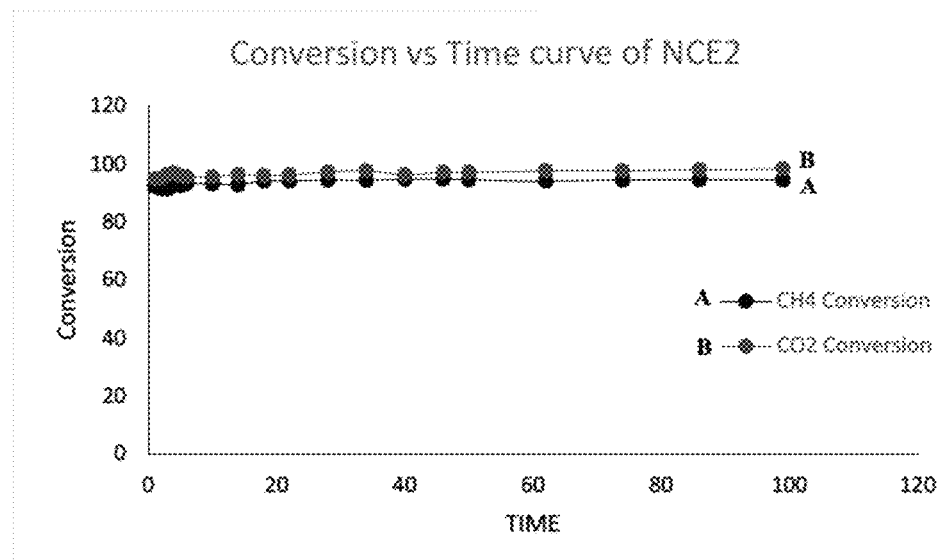
FIG. 8: Conversion vs Time curve of NCE2 catalyst.
Figure 9:
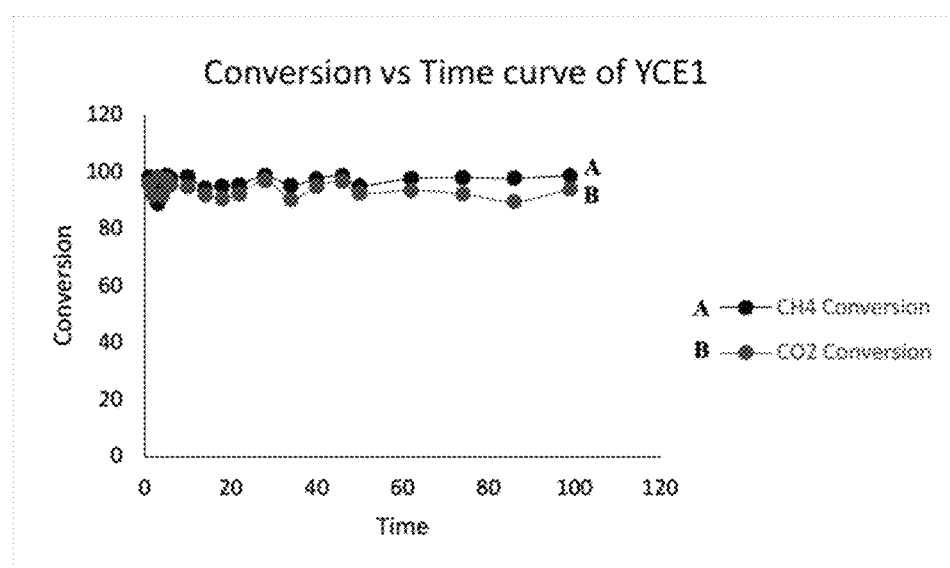
FIG. 9: Conversion vs. Temperature curve of YCE1 catalyst.

From the $H_2/CO$ ratio vs. Temperature curve (shown in FIG. 7) of different catalysts the two best possible catalysts are YCE1 and NCE2. Hence both the catalysts are characterised by different methods and time on stream was done with these two catalysts.

Example-7

The example describes the dry reforming of methane and selectivity of CO and $H_2$ derivatives for YCE1 catalyst. The product analysis presented in (Table-4).
Process Conditions:
Catalyst: 0.2 g
Ni:Ce—$MgAl_2O_4$ wt. % in the catalyst=5%
Pressure: Atmospheric
Reduction temperature: 800° C.
Reaction temperature: 700° C.
Reaction time: 100 hr.
Flow of the gas: Methane (99.99%)=4 ml
Carbon dioxide (99.99%)=4 ml
Helium (99.999%)=26 ml
The total flow of the gas is calculated according to the GHSV 10000 $cm^3\ g^{-1}\ h^{-1}$.

TABLE 5

| Time (in hr.) | $CH_4$ conversion (in %) | $CO_2$ conversion (in %) | CO selectivity (in %) | $H_2$ selectivity (in %) | CO yield (in mL) | $H_2$ yield (in mL) | $H_2/CO$ ratio |
|---|---|---|---|---|---|---|---|
| 1 | 92.19 | 94.91 | 47.91 | 50.99 | 0.98 | 1.04 | 1.06 |
| 2 | 91.42 | 95.13 | 46.81 | 52.05 | 0.97 | 1.07 | 1.11 |
| 3 | 91.34 | 96.45 | 45.80 | 52.91 | 0.76 | 0.88 | 1.15 |
| 4 | 92.86 | 96.88 | 45.57 | 53.29 | 0.72 | 0.85 | 1.16 |
| 5 | 92.50 | 95.82 | 45.54 | 53.42 | 0.89 | 1.05 | 1.17 |
| 6 | 93.17 | 95.60 | 48.20 | 50.80 | 0.94 | 0.99 | 1.05 |
| 10 | 93.09 | 95.55 | 45.56 | 53.43 | 0.89 | 1.05 | 1.17 |
| 14 | 92.80 | 96.34 | 46.01 | 53.03 | 0.91 | 1.05 | 1.15 |
| 18 | 94.09 | 95.98 | 46.06 | 53.02 | 0.86 | 0.99 | 1.15 |
| 22 | 94.11 | 96.21 | 46.02 | 52.87 | 0.70 | 0.80 | 1.14 |
| 28 | 94.38 | 97.19 | 49.23 | 49.97 | 0.91 | 0.92 | 1.01 |
| 34 | 94.38 | 97.67 | 46.53 | 52.69 | 0.84 | 0.95 | 1.13 |
| 40 | 94.69 | 96.28 | 46.28 | 52.88 | 0.86 | 0.98 | 1.14 |
| 46 | 94.75 | 97.15 | 46.77 | 52.44 | 0.85 | 0.95 | 1.12 |
| 50 | 94.54 | 97.15 | 47.10 | 52.13 | 0.89 | 0.99 | 1.10 |
| 62 | 93.87 | 97.47 | 47.28 | 51.90 | 0.88 | 0.97 | 1.09 |
| 74 | 94.20 | 97.44 | 49.79 | 49.46 | 0.97 | 0.97 | 0.99 |
| 86 | 94.35 | 97.78 | 47.40 | 51.80 | 0.83 | 0.91 | 1.09 |
| 100 | 94.25 | 98.07 | 49.60 | 49.63 | 0.88 | 0.89 | 1.00 |

Example-8

The example describes the Dry reforming of methane and selectivity of CO and $H_2$ derivatives for the NCE2 catalyst. The product analysis presented in Table-5.
Process Conditions:
Catalyst: 0.2 g
Ni:$MgAl_2O_4$ wt. % in the catalyst=5%
Pressure: Atmospheric
Reduction temperature: 800° C.
Reaction temperature: 700° C.
Reaction time: 100 hr.
Flow of the gas: Methane (99.99%)=4 ml
Carbon dioxide (99.99%)=4 ml
Helium (99.999%)=26 ml
The total flow of the gas is calculated according to the GHSV 10000 $cm^3\ g^{-1}\ h^{-1}$.

TABLE 6

| Time (in hr.) | CH₄ conversion (in %) | CO₂ conversion (in %) | CO selectivity (in %) | H₂ selectivity (in %) | CO yield (in mL) | H₂ yield (in mL) | H₂/CO ratio |
|---|---|---|---|---|---|---|---|
| 1 | 98.18 | 95.79 | 44.81 | 51.33 | 0.79 | 0.90 | 1.14 |
| 2 | 94.35 | 91.63 | 43.45 | 47.75 | 0.79 | 0.87 | 1.14 |
| 3 | 88.79 | 98.27 | 45.22 | 45.63 | 0.77 | 0.77 | 1.00 |
| 4 | 92.18 | 91.63 | 43.71 | 46.04 | 0.81 | 0.85 | 1.12 |
| 5 | 98.58 | 97.18 | 48.58 | 48.65 | 0.84 | 0.84 | 1.13 |
| 6 | 97.56 | 95.27 | 44.86 | 49.90 | 0.69 | 0.77 | 1.14 |
| 10 | 98.30 | 94.64 | 46.38 | 48.65 | 0.74 | 0.77 | 1.15 |
| 14 | 94.12 | 91.80 | 47.49 | 47.67 | 0.81 | 0.81 | 1.14 |
| 18 | 94.90 | 90.54 | 49.33 | 48.61 | 0.85 | 0.84 | 1.11 |
| 22 | 95.27 | 92.01 | 45.10 | 46.51 | 0.86 | 0.89 | 1.13 |
| 28 | 98.59 | 96.92 | 45.06 | 46.53 | 0.88 | 0.91 | 1.16 |
| 34 | 95.13 | 90.16 | 45.98 | 46.38 | 0.87 | 0.88 | 1.13 |
| 40 | 97.47 | 94.82 | 47.44 | 49.53 | 0.79 | 0.83 | 1.12 |
| 46 | 98.56 | 96.57 | 44.88 | 46.37 | 0.85 | 0.88 | 1.16 |
| 50 | 95.04 | 92.44 | 47.50 | 47.34 | 0.80 | 0.80 | 1.13 |
| 62 | 97.54 | 93.32 | 48.67 | 47.53 | 0.70 | 0.68 | 0.94 |
| 74 | 97.86 | 92.20 | 45.44 | 46.29 | 0.78 | 0.80 | 1.13 |
| 86 | 97.70 | 89.50 | 46.50 | 47.65 | 0.81 | 0.83 | 1.15 |
| 100 | 98.56 | 93.85 | 46.21 | 47.73 | 0.84 | 0.87 | 1.17 |

The Main Advantages of the Present Invention are:
1. A process for the synthesis of valuable chemicals from two important greenhouse gases methane and carbon-di-oxide.
2. The process provides not only good conversion but also good selectivity towards synthesis gas.
3. The process produces synthesis gas at 700° C. constantly after 100 hours with equal selectivity which is a major advantage of this process.
4. The process does not need any addition reagent or polymeric additives to achieve good conversion during the whole reaction.
5. The catalyst is used in very low amounts.
6. The catalyst does not deactivate even after 100 hours.
7. The above example shows TOS (time on stream) of the two best catalysts, which gives quite good result, still after reaction it was observed with analyser that the YCE1 catalyst (i.e., with cerium) have very low amount of coke deposition compare to the NCE2 catalyst (i.e., without cerium). Therefore the previous catalyst i.e., YCE1 have good resistant power and good commercialised value. (shown in Table 7)

TABLE 7

| Sample | Coke deposition (in %) |
|---|---|
| YCE | 0 |
| YCE after 100 h reaction | 2.3 |
| NCE | 0 |
| NCE after 100 h reaction | 7.6 |

What is claimed is:
1. A process for the preparation of Ni—CeMgAl$_2$O$_4$ catalyst wherein the said process comprising the steps of;
   i. dissolving Aluminium isopropoxide in a mixture of ethanol and concentrated nitric acid;
   ii. preparing a second solution by dissolving Poly (ethylene glycol)-block-poly (propylene glycol)-block-poly (ethylene glycol) (P123) in mole ration ranging between 0.003-0.004 in ethanol;
   iii. adding salt of Magnesium and Cerium into the second solution;
   iv. mixing solution as prepared in step (i) and step (iii) and stirring for 8-10 hrs at room temp 25° C. for homogenation and kept for drying at 60-80° C. for 48-72 h and calcing at a range 700-900° C. for 6-8 hr and subsequently depositing nickel particles onto it to and further calcining at temperature 400-600° C. 6-8 h to obtain Ni—CeMgAl$_2$O$_4$ catalyst.

2. A process as claimed in claim 1, wherein the wt % of Ni to Ce—MgAl2O4 of the catalyst is varied in the range 1-10% (Ni:Ce—MgAl2O4).

3. A process as claimed in claim 1, wherein the wt % of MgO to Al2O3 of the catalyst is varied in the range of 1-5% (MgO:Al2O3).

4. A process as claimed in claim 1, wherein the wt % of Ce to Al2O3 is in the range of 0.1-5% Ce:Al2O3).

5. A process as claimed in claim 1, wherein Ni—CeMgAl2O4 catalyst contains high surface area in the range of 309-327 m2 g-1.

6. A process for dry reforming of methane with carbon dioxide using Ni—CeMgAl2O4 catalyst as obtained by the process as claimed in claim 1, wherein the said process comprises reducing the catalyst at 10-20% H$_2$/He mixture at temperature ranging between 800-1000° C. for a period ranging between 1-4 hrs. subsequently contacting 10-15% Methane, 10%-15% Carbon dioxide and 70-80% Helium at gas hours space velocity 10,000 cm$^3$ g$^{-1}$ h$^{-1}$ to 15,000 cm$^3$ g$^{-1}$ h$^{-1}$ over the catalyst at temperature ranging between 500-800° C. at atmospheric pressure to obtain syngas.

7. A process as claimed in claim 6, wherein conversions of CH4 and CO2 are in the range of 90%-98% for both.

8. A process as claimed in claim 6, wherein conversions of CH4 and CO2 are more than 90% without any noticeable deactivation till 100 hours.

9. A process as claimed in claim 6, wherein synthesis gas is obtained from methane and carbon dioxide with a H$_2$ to CO ratio in the range of 0.9-1.2.

* * * * *